Feb. 20, 1968 A. A. JORGENSEN ET AL 3,370,129
BIASED DIODE TELEPHONE LINE FINDING CIRCUITS
Filed Sept. 2, 1964
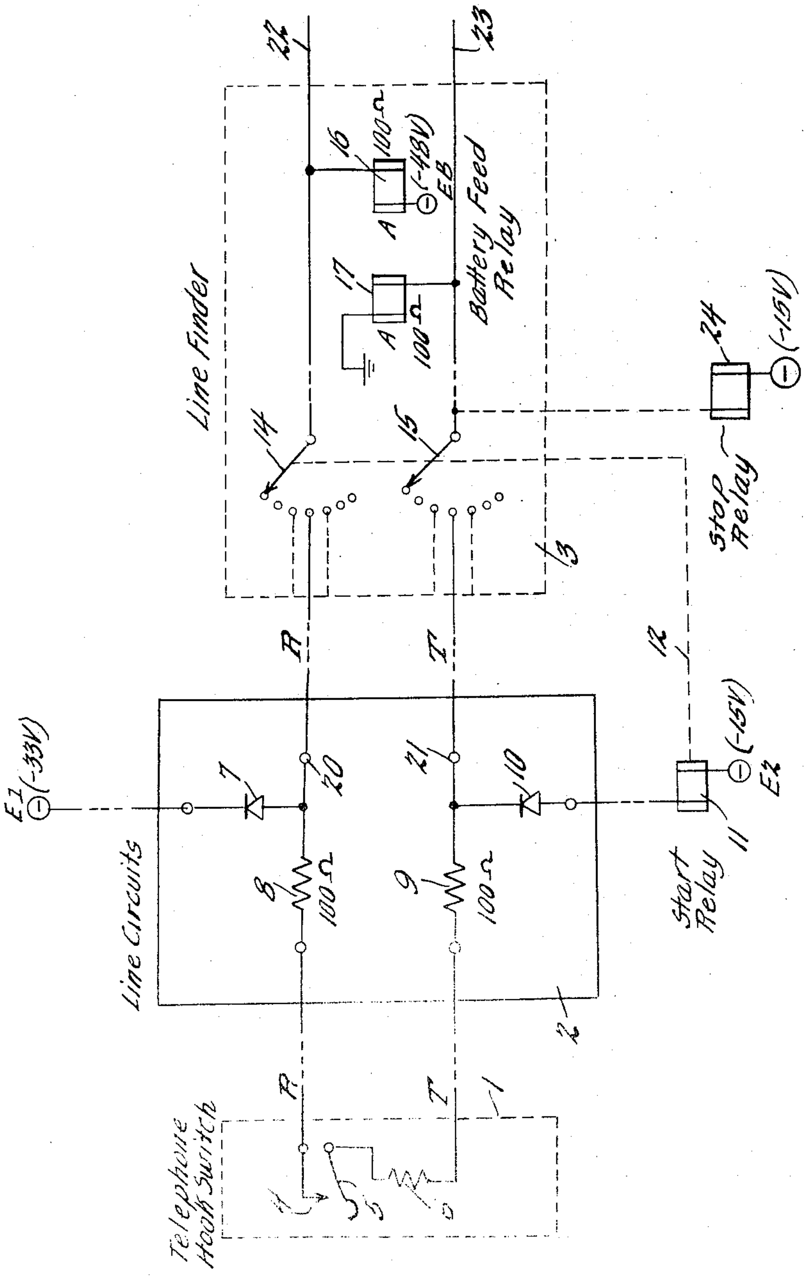
INVENTORS
Adam A. Jorgensen
Ernest O. Lee, Jr.,
BY Watson, Cole, Grindle and Watson
ATTORNEYS United States Patent Office 3,370,129
Patented Feb. 20, 1968

3,370,129
BIASED DIODE TELEPHONE LINE FINDING CIRCUITS

Adam A. Jorgensen and Ernest O. Lee, Jr., Charlottesville, Va., assignors to Stromberg-Carlson Corporation, a corporation of Delaware
Filed Sept. 2, 1964, Ser. No. 393,988
2 Claims. (Cl. 179—18)

A telephone line finding circuit has two diodes connected to the lines for providing a start relay current path from a D-C source potential when the hook switch couples the lines together. Line finder circuits then connect a third higher potential blocking both diodes to isolate the lines and prevent crosstalk. This is accomplished simply by having two negative potential levels both lower than the blocking potential coupled respectively to anode and cathode of different diodes on the tip and ring telephone lines so that current flows through both diodes and a relay winding when the hook switch couples the lines together.

This invention relates to line circuits such as used in telephone switching systems, and more particularly it relates to means for sensing a telephone hook switch operation to initiate a line finder searching cycle.

Complex electromechanical switching circuits have been used conventionally in line finder circuits, requiring sequences of relay operations for obtaining the necessary functions for (1) sensing an off-hook condition at a particular telephone set, (2) the initiation of a searching cycle in the line finder part of the telephone system, (3) the marking of the line at the telephone set for permitting the line finder to identify that line, and (4) completing the line finding search cycle when the line is identified.

It is an object of this invention to provide simplified and more reliable circuits for performing these functions with fewer elements and less electromechanical equipment.

A general object of the invention is to provide improved line circuits useful in telephone switching systems.

Another object of the invention is to provide simple solid stage switching circuits useful in telephone systems.

The invention itself provides a simplified circuit comprising two diodes coupled with corresponding bias voltage levels in such a manner that the circuit performs all the above mentioned switching functions and additionally isolates telephone line circuits from one another to prevent crosstalk. The diodes thus comprise a unilateral conducting path through the telephone hook switch circuit for operating a current responsive starting circuit for initiating a search cycle with line finding equipment at the central office.

These and other objects and features of the invention may be related to the detailed description of the invention by reference to the accompanying drawing, which sets forth a circuit diagram of a portion of a typical telephone system embodying the invention.

In the drawing the tip T and the ring H conductor lines are shown extending from the telephone set 1 through the line circuits 2 and into the line finder circuits 3. The circuit lines are dotted at positions indicating variable lengths and intervening auxiliary circuit connections.

At the telephone set 1, the hook switch 4 is provided in normally open condition as shown when the receiver is on-hook. However, when the receiver is lifted off-hook, the spring contact 5 serves to close the contacts and establish a circuit through resistor 6 repreesntative of the normal telephone set load on the line conductors T and R.

In the off-hook condition, a direct current flow circuit is completed from potential source $E_1$ through diode 7, resistor 8, the telephone set resistor 6, resistor 9, diode 10, and start relay 11 to potential source $E_2$. The start relay 11 may be common to a number of line circuits as shown by the broken lines thereto.

This direct current flow circuit operates start relay 11, which is shown by dotted line 12 to cause line finding sweeper arms 14 and 15 to go through a search procedure across the various contacts representative of a plurality of telephone lines. Furthermore, potential $E_1$, formerly blocked by the open hookswitch contact, now by current flow through the circuit, establishes terminal 21 of the tip conductor T at a marking potential of substantially 33 volts. Accordingly, the line-finder sweeper arm 15 searches for the marked terminal amongst the various lines connected to its associated contact so that it may stop at the marked location. When encountering the marked tip conductor lead 21, the sweeper arm 15 establishes a circuit through the winding of a stop relay 24 which causes the switch to stop on the terminals 20 and 21 of the marked line circuit. After the switch has stopped, the switch arms 14 and 15 are connected by contacts of a cut-thru relay to windings 16 and 17 respectively of battery-feed relay A, thus the ring conductor terminal 20 is connected through winding 16 of battery-feed relay A to the —48 volt potential of battery source $E_B$. Simultaneously sweeper arm 15 grounds the tip conductor terminal 21 through winding 17 of the battery-feed relay A.

The circuit resistance of windings 16, 17, resistors 6, 8 and 9, and the relative voltages $E_1$, $E_2$, and $E_B$ are proportioned to back bias diodes 7 and 10 and make them non-conducting. That is the voltage at terminal 20 will exceed —33 volts of diode 7 to cut it off, and the voltage at terminal 21 is less than —15 volts to cut off diode 10 when current flows from battery source $E_B$ to ground through conductors T and R and the line finder switch arms 14, 15. Accordingly, current flow to the start relay 11 is blocked releasing said start relay 11 and completing the line finding cycle.

Note that when the diodes 7 and 10 are in this nonconductive condition, the line is in use for talking or ringing, and the diodes serve to isolate this particular line from other line circuits coupled to start relay 11 or potential source $E_1$ and prevent crosstalk of conversation or ringing signals.

In operation therefore the normally open hook switch 4 is closed when the receiver is removed, to thus connect together the two conductors R and T of the telephone line. The start relay 11 is actuated responsive to the resultant current flow through diodes 7 and 10 to initiate a search cycle in the line finder 3. When the line marked by the potential level $E_1$ established by that current flow is found by switches 14, 15, a different potential source level $E_B$ serves to terminate the search cycle by making the diodes 7, 10 non-conductive and blocking current to the start relay. Then the telephone 1 is coupled through the line finding equipment 3 in the central office to the lines 22, 23 for use in ringing and conversation through use of conventional circuits.

Accordingly, a simplified and effective line circuit is provided by this invention which satisfies all the functions of the line finding operation and requires fewer electromechanical switches, relying on the more reliable operation of solid state diodes 7 and 10. The features of novelty are defined with particularity in the appended claims. The use of the diode line circuit is not confined to electromechanical switching systems, as in the example described. It may be used in conjunction with solid state circuitry to perform the starting and stopping functions, for example.

We claim:

1. A telephone circuit for line finding in a telephone system comprising in combination, a telephone set having a normally open hook switch circuit when the telephone receiver is on-hook, a telephone line having two conductors coupled to said set to be connected together when said switch circuit is closed, a line finding circuit in said telephone system for scanning through a plurality of lines to establish a connection at a line for which said hook switch circuit is closed, selectively actuated scanning means operable in said line finding circuit to initiate and terminate a searching cycle, the improvement comprising means for actuating said scanning means responsive to the closing of said hook switch circuit including a first diode having one electrode coupled to one of said conductors, a second diode having an electrode different from that of the first diode coupled to the other of said conductors, a switching device operable responsive to current flow through both diodes to actuate said scanning means, potential means of a single polarity connected to each diode at a terminal not connected to the conductors having different potentials X and Y of a given polarity at the different diodes connected to pass current through said diodes and said switching device only when said hook switch circuit is closed to connect electrodes of the diodes together thereby initiating said searching cycle, and means for terminating said searching cycle and isolating said lines when said telephone line is encountered by said scanning means while said hook switch is closed comprising, a potential source having a terminal of said given polarity and a potential greater than either X or Y connected to said scanning means for connection thereby to said lines thereby to pass current through said lines via the closed hook switch circuit whereby said diodes are made non-conductive to both disconnect the switching device and isolate the lines for voice communication.

2. A line circuit for a telephone system comprising in combination, a two conductor line having a telephone set at one end for connection thereto by operation of a hook switch, a current responsive starting circuit for a line finding operation, a circuit comprising two diodes coupled respectively to each conductor in a unilateral current path through said hook switch, means passing current from said unilateral path to said starting circuit comprising a source of D-C potential at one end of the unilateral path and a source of D-C potential of less voltage but the same polarity coupled to the other end of the unilateral path through the starting circuit, a third potential source of the same polarity and higher voltage, and line finding means operable to connect said third potential to said line to block current flow in both diodes in said path when encountering line conductors connected together by said hook switch.

References Cited

UNITED STATES PATENTS

| | | | |
|---|---|---|---|
| 2,612,564 | 9/1952 | Oberman | 179—18.6 |
| 2,657,270 | 10/1953 | Buchner | 179—18.6 |
| 3,134,857 | 5/1964 | Kolbinger | 179—18.3 |
| 3,193,621 | 7/1965 | Lummis | 179—18.6 |

WILLIAM C. COOPER, *Primary Examiner.*

KATHLEEN H. CLAFFY, *Examiner.*

L. A. WRIGHT, *Assistant Examiner.*